US007661390B2

(12) United States Patent
Mortensen (10) Patent No.: US 7,661,390 B2
(45) Date of Patent: Feb. 16, 2010

(54) SYSTEM FOR CULTURE AND STORAGE OF BENTHIC ORGANISMS IN AN AQUATIC ENVIRONMENT

(75) Inventor: Vidar Mortensen, Tromsø (NO)

(73) Assignee: Praktisk Teknologi AS, Alta (NO)

( * ) Notice: Subject to any disclaimer, the term of this patent is extended or adjusted under 35 U.S.C. 154(b) by 379 days.

(21) Appl. No.: 10/546,737

(22) PCT Filed: Feb. 27, 2004

(86) PCT No.: PCT/NO2004/000058

§ 371 (c)(1),
(2), (4) Date: Nov. 25, 2005

(87) PCT Pub. No.: WO2004/075633

PCT Pub. Date: Sep. 10, 2004

(65) Prior Publication Data

US 2006/0130772 A1 Jun. 22, 2006

(30) Foreign Application Priority Data

Feb. 28, 2003 (NO) .................................. 20030973

(51) Int. Cl.
*A01K 61/00* (2006.01)
(52) U.S. Cl. ..................................................... 119/240
(58) Field of Classification Search ......... 119/239–241, 119/207–210, 221
See application file for complete search history.

(56) References Cited

U.S. PATENT DOCUMENTS

| 428,983 A * | 5/1890 | Weston et al ................ 119/214 |
| 2,989,945 A * | 6/1961 | Ford ............................ 119/240 |
| 3,741,159 A * | 6/1973 | Halaunbrenner ............ 119/240 |
| 3,870,019 A | 3/1975 | McNicol ........................ 119/4 |
| 4,007,709 A * | 2/1977 | Wishner ...................... 119/210 |
| 4,186,687 A * | 2/1980 | Gilpatric ..................... 119/241 |
| 4,300,477 A * | 11/1981 | Chapman .................... 119/210 |
| 4,344,384 A * | 8/1982 | Rowley ....................... 119/241 |
| 4,377,987 A * | 3/1983 | Satre .......................... 119/241 |
| 4,559,902 A * | 12/1985 | Mason et al. ............... 119/209 |
| 5,628,280 A | 5/1997 | Ericsson ..................... 119/239 |
| 5,653,193 A * | 8/1997 | Marissal ..................... 119/240 |
| 7,357,097 B2 * | 4/2008 | Drengstig et al. ........... 119/207 |

FOREIGN PATENT DOCUMENTS

WO WO02/01947 1/2002

OTHER PUBLICATIONS

Fiskeriforskning Informerer No. Mar. 2002, 2 pages with English translation.

* cited by examiner

Primary Examiner—Thomas Price
(74) Attorney, Agent, or Firm—Jacobson Holman PLLC (57) ABSTRACT

A system for culture and storage of benthic organisms in an aquatic environment including at least two containers for storing organisms, releasably interconnected and forming a stack in the height direction, at least two lines attached to the stack and connected to at least the upper portion of the stack, and a suspension device connected to the lines. The system may also include a working platform and raising/lowering device(s) for raising and lowering stacks. A method for handling containers for storage of benthic organisms in an aquatic environment is also disclosed.

16 Claims, 6 Drawing Sheets

SYSTEM FOR CULTURE AND STORAGE OF BENTHIC ORGANISMS IN AN AQUATIC ENVIRONMENT

This is a nationalization of PCT/NO04/000058 filed Feb. 27, 2004 and published in English.

The invention relates to a system for culture and storage of benthic organisms such as sea urchins, abalone, scallops, sea cucumbers and oysters in an aquatic environment.

Solutions currently employed for this type of sea-based farming vary from species to species, but there are some basic features:

Tray/box-based systems (for example Nestier, McNichol, Dark Sea™, High Flow™ and Aqua Stacks™) consist of perforated trays/boxes which can be stacked on top of one another. The boxes are secured together in a stack by means of rope or a kind of locking mechanism. Culture of these systems is carried out by raising a stack, releasing it, tending each individual box and restacking them before returning them to the water. Other examples of such stack-based systems are disclosed in U.S. Pat. No. 3,499,421, U.S. Pat. No. 3,702,599 and U.S. Pat. No. 4,061,110.

Other tray/box-based systems insert the trays/boxes in a suitable shelf, rather like drawers in a chest of drawers. An example of such a system is disclosed in U.S. Pat. No. 5,628,280.

All of these systems have the following drawbacks:

They have limited capacity per stack/shelf since the height is restricted to the operator's maximum lifting height.

They demand a great deal of physical labour in the form of lifting and assembly/disassembly of the stacks or removal from and insertion in the shelves.

The farmed organisms are kept out of the water for long periods since the task of tending the whole stack/shelf has to be completed before it can be returned to the water.

They have insufficient through-flow of water. Since the stacks are usually grouped in fair-sized units (in order to reduce the number of lifting operations), the stacks block one another's through-flow of water. This impairs the biological conditions and probably has negative consequences with regard to mortality and growth.

Alternatively, the trays/boxes may be interconnected sideways or individually on a long-line. In this case they are also tended individually but with a natural connection to the next unit, with the result that the tending operation can be regarded as a continuous process along all the trays/boxes that are attached to one another or to the long-line. Examples of such systems are The Aquapurse™ and Aquatray™ (in a sideways configuration). The greatest drawback of these systems is poor exploitation of the area of a location since they are only one unit high. Furthermore, they are sensitive to waves since the trays/boxes weigh little individually.

Other existing variants include systems where the farmed organisms are kept in soft purses with or without additional rigid elements. Examples of these are traditional lantern and pearl nets. These are more difficult to gain access to for performing tending operations and are therefore more labour-intensive than the above-mentioned tray/box systems. By virtue of their soft consistency, moreover, they do not provide the farmed organisms with any protection against impact or the like during handling.

The object of the invention is to provide a system for culture and storage of benthic organisms in an aquatic environment which counteracts the drawbacks of the prior art.

The object of the invention is achieved by means of the features in the patent claims.

In an embodiment the system according to the invention comprises storage containers for storing organisms, releasably interconnected in such a manner that the containers form a stack in the height direction, at least two lines attached to the stack's lower portion and connected to at least the stack's upper portion and a suspension device connected to the lines.

The system may also comprise at least one collecting cord which is movably connected to all the containers and which is attached to the stack's upper and lower portions.

The system may also comprise one or more weights integrated in or connected to the stack's lower portion, for example the bottom container, or connected to the lines' lower portion.

The storage containers may, for example, be boxes, tins, cages or the like. The containers may be of any desired shape and size, but in many cases it will be expedient to employ square containers adapted to suit a standard transport size, for example Europallet or industry pallet. In one embodiment the containers have a lid, but it may also be considered to be sufficient for the container to be closed by the bottom of the container above it in a stack. The lid is preferably sealed to prevent dirt from the overlying containers from dropping into the container. The containers are equipped with perforations on at least two of the side walls in order to provide good water circulation/replacement in the containers, thereby also preventing the accumulation of feed residue, excrements or other impurities. It is particularly important to have perforations in the side walls which are perpendicular to the water's direction of flow when the containers are placed in the water.

The containers are adapted so that they can be placed on top of one another, thus forming a stack. The containers may be releasably interconnected in such a manner that the stack of containers is relatively rigid, but where individual containers can easily be removed, for example by being able to release the top container in the stack or a container in the middle of the stack for handling by an operator. The containers are preferably arranged with a vertical space between them in the stack. This is achieved by means of spacers between the containers, or by the mechanism connecting the containers itself providing the spacing between the containers. The space between the containers permits water to flow between the containers, thus preventing waste matter from collecting there. In an embodiment the connection between the containers in the stack is designed in such a way that two of the container's opposite sides fit closely with the corresponding sides of the container below and above it in the stack, while the other two are open. This means that the connection between the containers is implemented by only two of the lateral edges. When two parallel opposite lateral edges fit closely while the other two are open, the closed sides will act as a rudder/keel in the water, keeping the stack in the correct position relative to the currents in the water.

In an embodiment the connection between the containers may be composed of a mechanism integrated in the containers. For example, the containers may have grooves running along the upper and lower edge of two opposite parallel side walls and the grooves at the upper and lower edge fit into each other when one container is placed on top of another. In an embodiment the side walls with the connecting mechanism are longer than the remaining side walls, and the grooves are provided on those parts of the side walls that extend past the other side walls. The grooves may be designed so as to lock the containers' relative movements in the height direction and in directions at an angle to the groove direction, but so as to enable the containers to be moved in the direction parallel to the grooves. To enable the containers' relative movement to also be locked at least temporarily in this last direction, the connecting mechanism may also include a locking device. The locking device may, for example, be a spring pin or the like mounted in the groove at the containers' lower edges and cooperating with a recess, notch or the like at the containers' upper edges in order thereby to lock the movement. By means of such a spring-loaded locking device the containers can be released from one another again when the load on the spring is relaxed, thus enabling the containers once again to move relative to one another in the groove direction.

The connection between the containers may also be implemented in other ways. For examples of this, see the description of the figures later in the document.

In order to achieve the desired stability when it is suspended in the water, a weight is preferably mounted at the stack's lower portion. In an embodiment the bottom container in the stack may be composed of a container of the same shape and size as the ordinary containers, but which is more rigid and capable of containing an extra mass, thereby forming the weight. Alternatively, a platform or the like may instead constitute the base and possibly the weight in the stack. In an embodiment a buoyancy body is provided at the top of the stack, for example by the top container being filled with a highly buoyant material such as, for example, polystyrene, air or the like.

The bottom container/base of the stack may also be designed to be able to be lifted by a forklift truck, for example by means of countersinks or openings in the bottom portion.

At the lower portion of the stack, for example on the bottom container/platform, there are attachment devices for lines, cords, chains, rope or the like which are used for suspending the stack of containers in the water. The lines run along the sides of the stack and at the upper portion of the stack the line is slidably connected with the stack, for example by means of hooks, eyes or the like attached to the top container or to a tie bar connected to the top container. Alternatively, the lines may be connected to several or all the containers in a stack, either in a fixed or a sliding manner. By this means the stack is kept in a stable position in the water and is aligned in such a manner that the openings between the containers are positioned perpendicularly to the water's direction of flow. In an embodiment weights may also be attached to the lower parts of the lines, either in addition to or as a replacement for weights provided as an integrated part of the stack as mentioned above.

The lines are connected to a support device such as a long-line, a buoy, a float, a rod, a tube, cord, chain or the like by means of a suspension device.

In some cases it will be practical for the stacks to be located, for example, on the seabed, in which case the lines will be employed for raising/lowering the stacks in and out of the water.

Above the support device there may be mounted a working platform. The working platform may be placed on a boat, raft or the like and used when the containers with the organisms have to be handled for feeding, planting, harvesting, cleaning, inspection or other tending operations. The working platform may be stationary or movable and is adapted to be capable of being temporarily or permanently at rest above a stack.

The working platform comprises at least one opening in which containers can be raised and/or lowered, and at least one raising/lowering device. The raising/lowering device(s) may be connected to the lines connected to the stacks, or connected to the stacks in some other way, in order to raise the stacks to the working platform and lower them into the water again after the work is completed. The raising/lowering device(s) may, for example, be power blocks or another type of pulley system, or other suitable mechanisms capable of raising and lowering units with the mass concerned.

The working platform also includes a transport device for moving the containers from the area where they are raised from the water to an area where they have to be lowered into the water again. The working platform may be arranged in such a manner that the container stacks are raised on one side of the support device and lowered again on the other side of the support device. The transport device may, for example, be several rollers arranged in parallel beside one another so that they can rotate freely, a conveyor belt, a low-friction sliding surface, a sloping sliding surface, slide rails, a robot arm, a pull/push mechanism or the like. It is also possible for the transport device to be composed of the containers themselves, where the connecting mechanisms permit direct transfer between two stacks placed close beside each other. The transport device may also comprise a raising/lowering mechanism, thus enabling its height to be adapted to the height of the operator who has to use the system.

The system may also include various kinds of more or less automated functions, such as weighing, registration of box identity, feed refill, cleaning, photographing, removal of dead organisms. These functions can be performed by known per se components and, for example, be integrated in or provided in connection with the transport device.

When using the system, the organisms concerned are placed in the containers which are stacked and lowered into the water. At regular intervals an operator has to tend the containers, in which case the containers have to be raised from the water. The working platform is then placed over the stack in which the tending operation is to be conducted and the lines holding the stack are fastened to the raising/lowering device. The raising/lowering device raises the stack until the top container is located at the operator's working height, or to the same height as the transport device's transport height. If this top container is merely a buoyancy body, it is released from the stack and moved to a second position or laid aside. If the top container contains the organism that has to be tended, the lid is opened and the task is performed. When the tending operations are completed, the lid is replaced and the container released from the stack. The container is then moved to the second position, preferably by means of the transport device. In the second position, the first container (which may be a weighted container laid aside from another stack or the like, a buoyancy container or container with organisms) is attached to a line which in turn is connected to a raising/lowering device. Alternatively, the first container is replaced by a base in the form of a platform or the like, and the first container which is transferred is connected to the base. The stack is then raised further so that the next container reaches working height, the tending operation is performed in this container before it is moved to the second position via the transport device. In the second position the last container to be transferred is connected to the container already located there, and a second stack is formed, where the containers are now in the opposite order to that in the first stack. These actions are repeated until all the containers have been dealt with and the stack at the second position is complete. During the period between a container having been moved to the second position and a new container moved to the second position, the second stack is lowered a suitable distance to permit easy reception of a new container. Finally, if there is a container with a buoyancy body, this is connected to the top of the stack and to the lines. The completed stack is then lowered into the water again by means of the raising/lowering device.

The invention will now be described by means of examples with reference to the accompanying figures.

Figure 1:
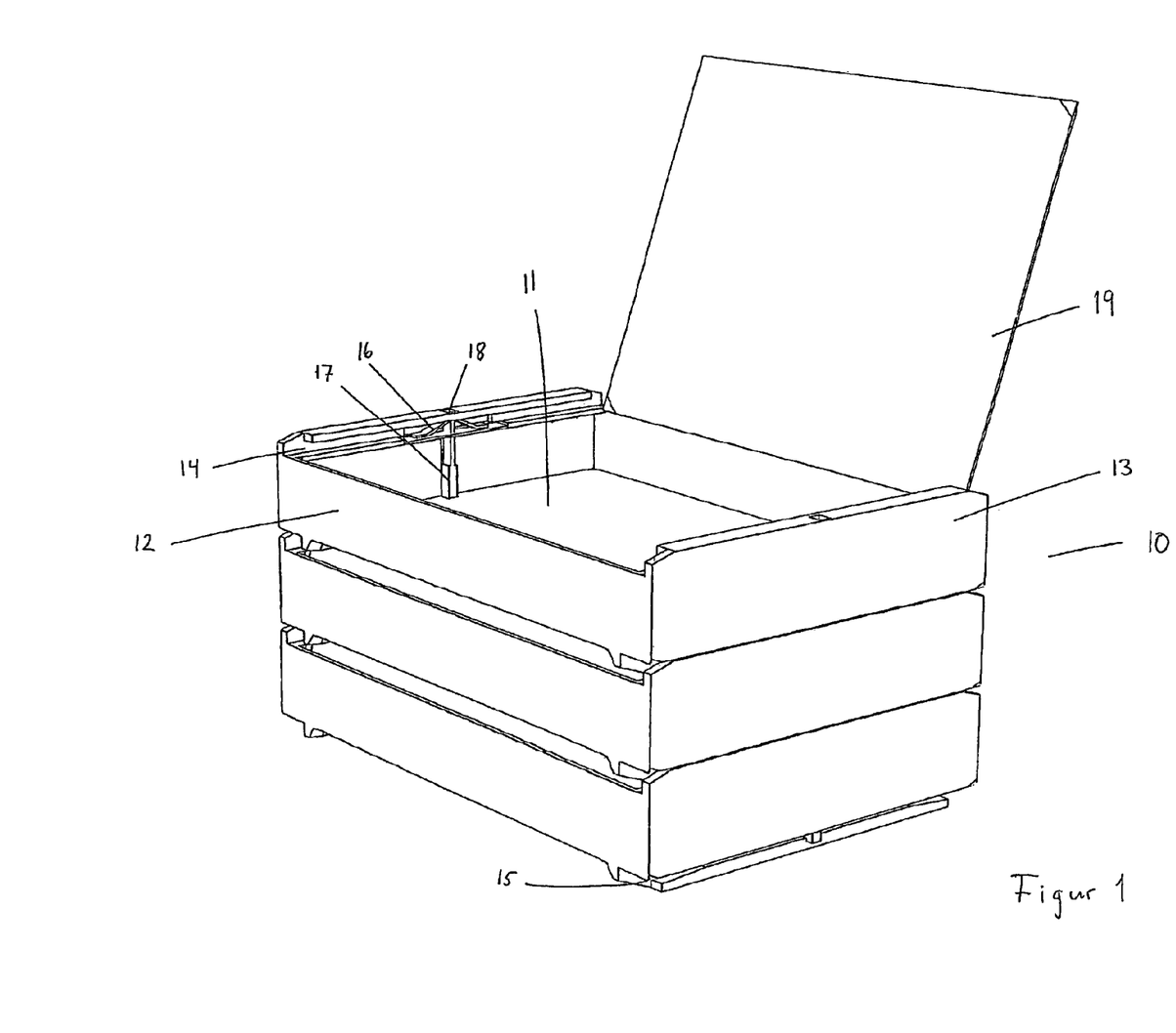
FIG. 1 illustrates an embodiment of a container for use in the system according to the invention.

FIG. 1 illustrates an embodiment of a container 10 for use in the system according to the invention. The container 10 is in the form of a box with bottom 11, two pairs of side walls 12, 13, where one pair 13 is shorter than the other 12 and a lid 19. In connection with the short side walls 13 there is provided a connecting mechanism comprising grooves 14, 15 at the upper and lower portions respectively of the side walls 13, a spring pin 17 and a notch 18. The grooves 14 and 15 are adapted so as to enable the grooves 15 on one container to be inserted in the grooves 14 on a second container when the containers are brought together to form a stack. When the grooves 14 and 15 are inserted in each other, a spring 16 which is connected to the pin 17 is pressed down, thereby pressing the pin 17 down into a notch 18 in the upper edge of the underlying container. In this manner the containers' movements relative to one another are prevented and when several containers 10 are placed on top of one another in this manner, a rigid and steady stack of containers is obtained. The grooves 14, 15 are provided on portions of the side walls 13 that project up from the containers' other side walls 12, thereby creating a space 9 between the containers which are interconnected. This space permits the through-flow of water between the containers in a stack and the connection between the short side walls 13 will act as a keel/rudder when the stack is placed in flowing water, thus giving the stack a fixed orientation relative to the flow of water. The containers are illustrated here as having whole sides, but in a preferred embodiment the long sides 12 will have perforations, openings or the like to permit the through-flow of water and thereby replacement of the water in which the organisms in the containers live.

Figure 2:
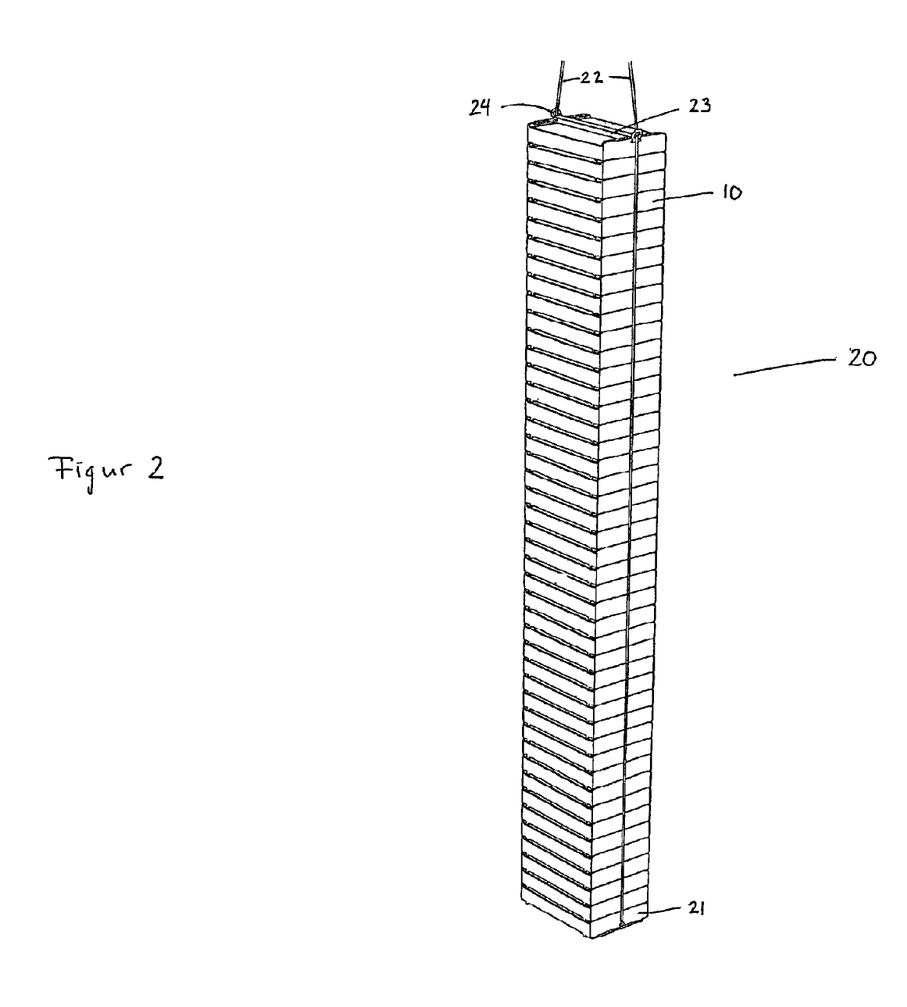
FIG. 2 illustrates a stack formed by several containers of the type illustrated in FIG. 1.

FIG. 2 illustrates a stack 20 formed by connecting several containers 10 on top of one another as described above. The bottom container 21 is connected to two lines 22 at the middle of the short walls. The lines 22 extend along the whole length of the stack 20 and through two hooks/eyes 24 which are attached to a tie bar 23. The tie bar 23 is adapted to cooperate with the grooves 14 illustrated in FIG. 1 so as to press the spring 16 down, thereby locking the two top containers in the stack together. The bottom container 21 is preferably extra reinforced and filled with a heavy material, thus acting as a weight and thereby holding the stack 20 in the correct position in the water. One or more of the top containers may be filled with a desired amount of a material with positive buoyancy, for example polystyrene or the like, thereby further assisting in holding the stack in the desired position.

Figure 3:
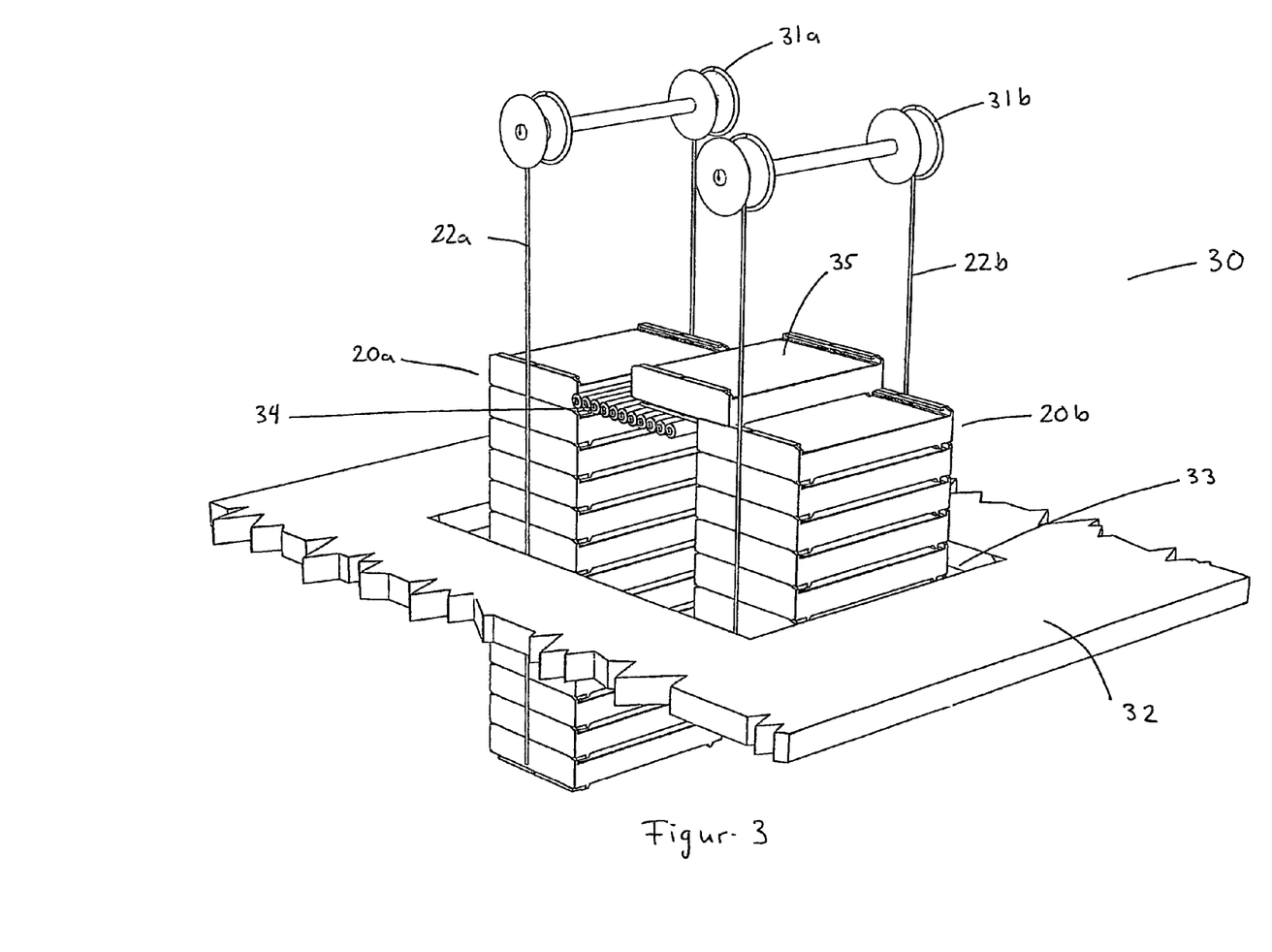
FIG. 3 illustrates an embodiment of a system for culture and storage of benthic organisms according to the invention.

In FIG. 3 there is illustrated an embodiment 30 of the system according to the invention. In this embodiment containers are employed of the type described in FIG. 1, assembled in stacks of the type illustrated in FIG. 2. The lines 22a are connected to raising/lowering devices 31a which in this embodiment are composed of power blocks. The raising/lowering devices 31a are mounted above an opening 33 in a working platform 32. The working platform 32 is arranged in such a manner that the opening 22 is located directly above the stack 20a of containers when the stack is submerged in the water for storage/growth of the benthic organisms concerned. When an operator needs to gain access to the containers in the stack, the stack 20a is raised by means of the raising/lowering devices 31a until the top container is at the operator's working height. The tie bar and/or any other container(s) are removed, the lid of the top container is opened and the tending operation is carried out. When the tending operation is completed, the lid is replaced on the container and the container is released from the stack. In the illustrated embodiment the top container is at all times free to be moved in the direction parallel to the grooves in the containers' lateral edges, and the container 35 is pushed out of engagement with the underlying container and placed on a transport device 34. In this embodiment the transport device 34 comprises several elongated rollers arranged in parallel beside one another and oriented at right angles to the container's direction of movement. The rollers can rotate with little friction and when a container 35 is pushed out on to the transport device 34, it will be easily moved on to the end of the transport device. At the end of the transport device a bottom container is fastened to a new pair of lines 22b which are connected to a raising/lowering device 31b and lowered until its upper surface is on a level with the surface of the transport device 34. The container 35 which is transferred to the transport device is pushed into the grooves on the container located there and a new stack 20b is formed. The stack 20b is lowered until the upper container's upper surface is on a level with the surface of the transport device 34 and the operation described above is repeated for the remaining containers in the stack 20a. When all the containers in the stack 20a have been transferred to the stack 20b, the tie bar is placed on the top container and the stack is lowered into the water again. If so desired, the working platform may then be moved to a new stack in order to repeat this described procedure.

Figure 4:
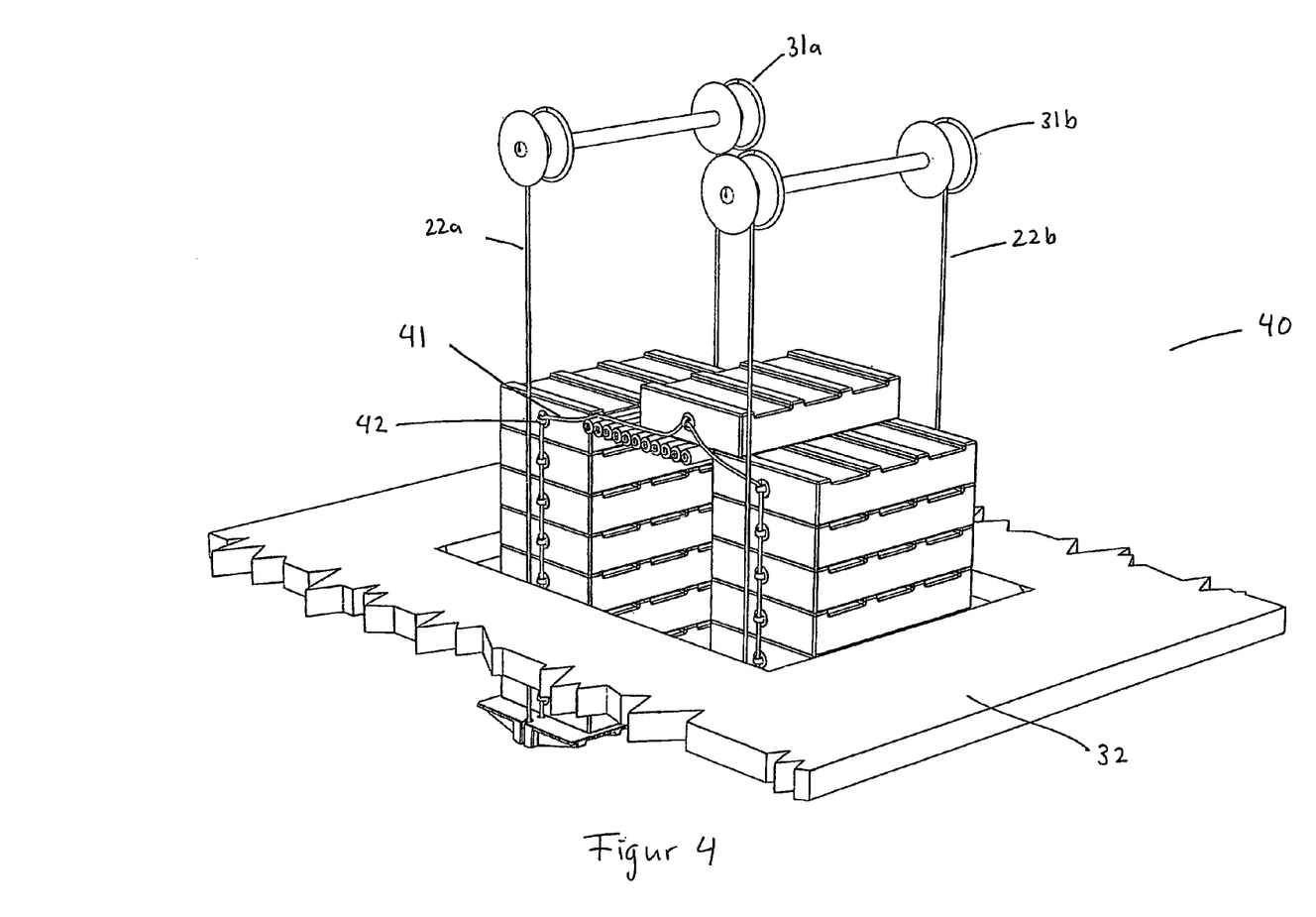
FIG. 4 illustrates another embodiment of a system according to the invention.

FIG. 4 illustrates another embodiment 40 of the system according to the invention. The system resembles the embodiment described in connection with FIG. 3, but employs a different type of container and stack. The containers employed in FIG. 4 are interconnected by means of a collecting cord 41 which is movably connected with each container in the stack. Instead of the grooves employed in the previously described embodiment, the containers comprise a cord holder device 42 which is rotatably mounted on at least one of the ends of the containers, and through which the cord can run freely. In addition, the stack may comprise a cord tensioner, or a cord fastener which holds the cord taut, for example a cleat, a kevel, a connector or other kind of clamp, or the like, thereby keeping the containers in the stack together. During tending and handling of the containers, the cord is slackened, thus enabling the containers to be dealt with in a sequence as described above in connection with the embodiment illustrated in FIG. 3.

Figure 5:
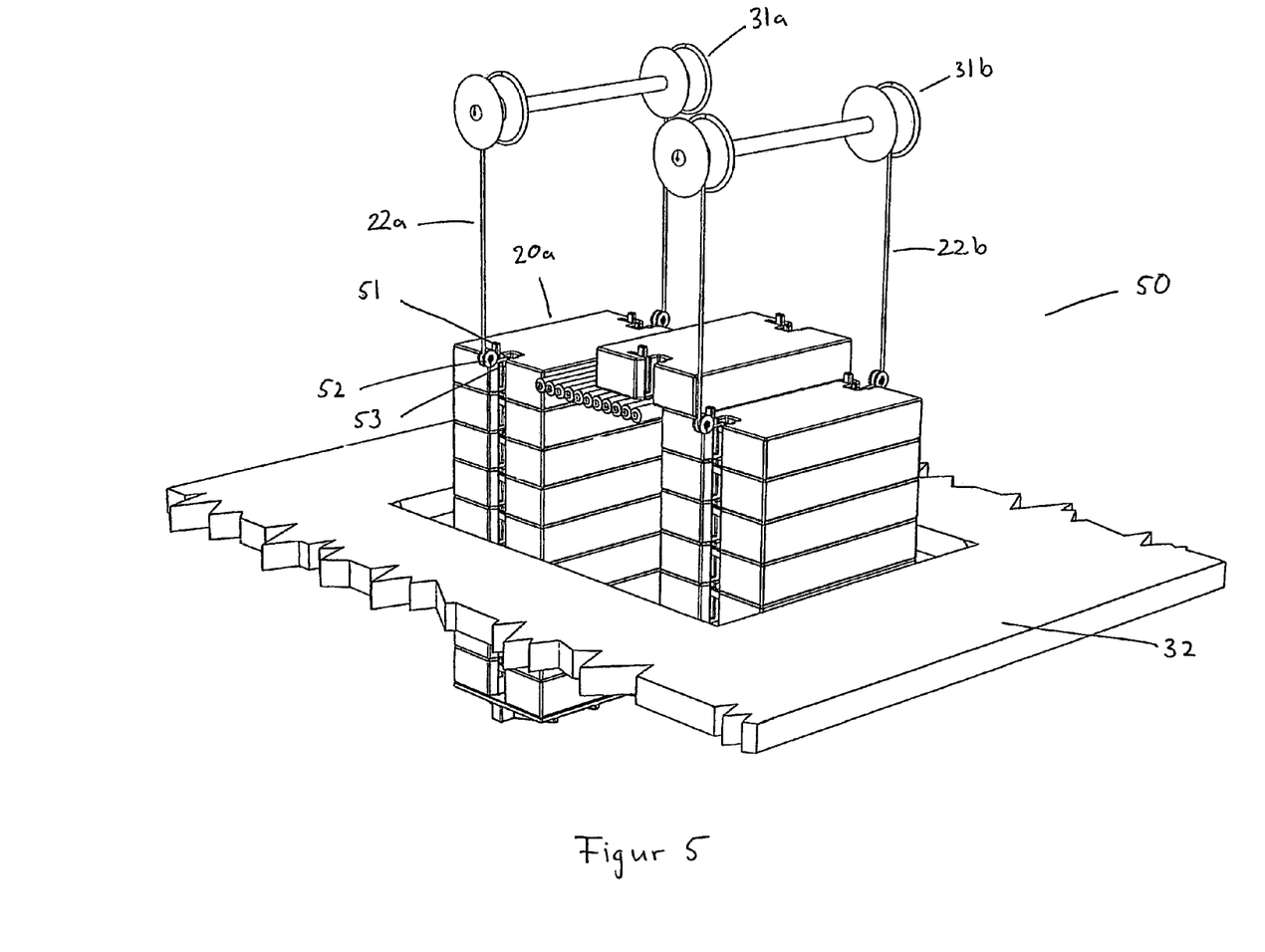
FIG. 5 illustrates a further embodiment of a system according to the invention.

FIG. 5 illustrates yet another alternative embodiment 50 of the system according to the invention, employing a different type of container to those previously described. In this embodiment the containers have deep indentations in the sides inside which the lines 22 are held by means of a lever arm 51. In its starting position the lever arm 51 will be tilted downwards due to its specific gravity. The lever arm may also have an air pocket at the outermost point of the long end, with the result that this end will have a tendency to move upwards in water, while in air it will tend to fall down.

During transfer to a new stack, the arm is tilted up when the next box is pushed in from the side. When there is a box above, it therefore becomes impossible for the arm to tilt down again. Between the raising/lowering device 31 and the stack 20 there are provided rollers 52 and 53. The rollers 52 and 53 increase the width between the lines 22, thus causing them to come out of the indentation as the box is raised. (The lines are ordinarily deep within the groove and are not shown in the drawing).

Figure 6:
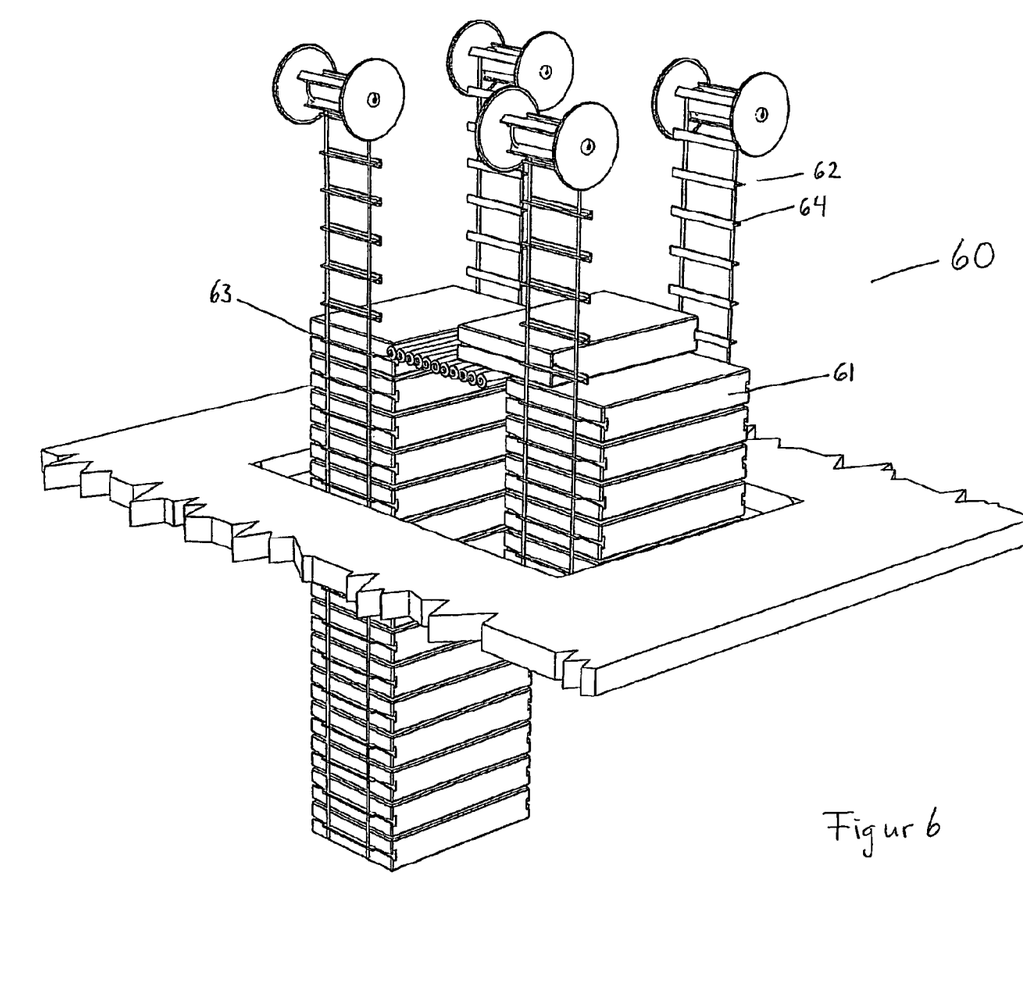
FIG. 6 illustrates yet another alternative embodiment of a system according to the invention.

FIG. 6 illustrates a further alternative embodiment 60 of the system according to the invention. Like the lines 22 in the previously described embodiments, this embodiment comprises rope ladder devices 62 which are employed to raise/lower the stack and which hold the stacks together. In this embodiment the containers 61 have parallel longitudinal grooves 63 on the outside of two parallel side walls which fit in with the "ladder steps" 64 in the ladder device 62. The ladder steps 64 and the grooves 63 preferably also comprise a locking device, for example of the spring pin type as described in connection with the embodiment in FIG. 1. In this embodiment the containers can be kept completely separated at a desired distance apart, and regardless of the state of the current in the water, the boxes will be able to lie in a horizontal position. This embodiment can therefore be employed in exposed locations for species with a great need for through-flow of water. In this embodiment each container can also be released independently of the others and independently of the order. The method for use of the system may be the same as for the other embodiments with the exception of the manner of releasing/connecting the individual containers.

Many alternatives and modifications of the described embodiments are possible. Features of the embodiments may be combined, or simpler solutions may be employed. For example, the lines may be fastened to other parts of the stacks, and the stacks may be raised/lowered by means of the lines and/or other means.

The invention claimed is:

1. A system for culture and storage of benthic organisms in an aquatic environment, the system comprising
at least two box-shaped containers for storing organisms, releasably interconnected on top of each other and in contact with each other and forming a stack in a height direction,
at least two lines attached to the stack and connected to at least an upper portion of the stack, and
a suspension device connected with the lines,
the containers being interconnected such that individual containers are removable while the rest of the containers in the stack remain rigidly interconnected,
the box-shaped containers having two parallel straight lateral edges containing grooves arranged at upper and lower edges so that when the grooves at a container's lower edge are inserted into the grooves at a second container's upper edge, an interconnection is made between the containers and relative movement is enabled between the containers in a direction parallel to the grooves, but locks movement in directions at an angle to the direction parallel to the grooves.

2. The system according to claim 1,
further comprising a weight integrated in or connected to at least one of a bottom and a top container.

3. The system according to claim 1,
wherein the lines are attached to a lower portion of the stack.

4. The system according to claim 3,
further comprising a weight connected to a bottom portion of the lines.

5. The system according to claim 1,
further comprising a platform mounted above the suspension device, the platform including at least one raising/lowering device and at least one opening for at least one of receiving and lowering containers.

6. The system according to claim 5,
wherein the platform also includes a transport device mounted above/between the at least one opening.

7. The system according to claim 6,
wherein the transport device is connected to a raising/lowering mechanism to permit a height of the transport device above the platform to be adjusted.

8. The system according to claim 5,
wherein the platform is movable.

9. The system according to claim 1,
further comprising at least one collecting cord which is movably connected with all the containers and attached to the upper portion and a lower portion of the stack.

10. The system according to claim 1,
wherein the containers include a cord holding device which is rotatably mounted on at least one of the ends of the containers and through which a cord runs freely.

11. A method for handling containers for storage of benthic organisms in an aquatic environment by a system including at least two containers in a stack, at least two lines attached to a lower portion of the stack and connected to at least an upper portion of the stack, a suspension device connected to the lines, a platform with at least one opening, a raising/lowering device and a transport device, the method comprising the following steps:
a) attaching the lines to the raising/lowering device,
b) raising a first stack to a position where a top container corresponds to an operator's working height or a transport device's working height above the platform by the raising/lowering device,
c) releasing the top container from the first stack,
d) transferring the top container by the transport device to a second position, and initially attaching a first container in the second position to lines connected to a raising/lowering device,
e) for containers which are transferred after attachment of the first container, connecting a last transferred container to a previous container transferred, thus forming a second stack,
f) lowering the second stack until the upper surface of the stack's top container comes into alignment with a transport device's transfer plane,
g) repeating steps b)-f) until all the containers in a stack have been transferred, and
h) lowering the second stack.

12. The method according to claim 11,
wherein tending is performed when the container is located at the top of the first or the second stack or on the transport device.

13. The method according to claim 11,
further comprising releasing lines from the raising/lowering device.

14. The method according to claim 11,
wherein when at least one of a top and a bottom container in the first stack does not contain benthic organisms, the at least one of the bottom and the top container is removed from a handling process for subsequent return to a stack.

15. The method according to claim 14,
wherein the at least one of the top and the bottom container includes one of buoyancy bodies and weights.

16. The method according to claim 11,
wherein the first container in step d) is one of a container containing a weight and a container including benthic organisms.

* * * * *

UNITED STATES PATENT AND TRADEMARK OFFICE
CERTIFICATE OF CORRECTION

PATENT NO. : 7,661,390 B2
APPLICATION NO. : 10/546737
DATED : February 16, 2010
INVENTOR(S) : Vidar Mortensen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Thirtieth Day of November, 2010

David J. Kappos
*Director of the United States Patent and Trademark Office*